3,153,044
**PROCESS FOR THE PREPARATION OF
2-CHLOROPYRIDINE**
Joel A. Zaslowsky, Woodbridge, Conn., assignor to Olin Mathieson Chemical Corporation, a corporation of Virginia
No Drawing. Filed Jan. 28, 1963, Ser. No. 254,430
9 Claims. (Cl. 260—290)

This invention relates to the preparation of 2-halopyridines, such as 2-chloropyridine.

2-halopyridines are useful as intermediates in the preparation of fungicides, bacteriostatics and the like.

Numerous techniques have been developed for the production of 2-halopyridines, such as 2-chloropyridine. For example, chlorine and pyridine have been reacted in the vapor phase to yield 2-chloropyridine. This technique has been found to be unsatisfactory because tarry by-products, flashing and carbonization occur unless close control is maintained over the reaction. In addition the flashing frequently results in explosions which may damage equipment and markedly reduce production.

It is a primary object of this invention to provide an improved process for preparing 2-halopyridines, such as 2-chloropyridine, which overcomes the disadvantages of prior art processes.

Another object of this invention is to provide an improved process for preparing 2-chloropyridine wherein flashing, carbonization, and the formation of tarry by-products are substantially minimized.

These and other objects of the invention will be apparent from the following detailed description thereof.

The novel process of this invention may be employed to prepare 2-chloropyridine and 2-bromopyridine. However for purposes of clarity, the invention will be described with respect to the preparation of 2-chloropyridine from chlorine and pyridine, with the understanding that 2-bromopyridine can also be prepared from pyridine and bromine in a similar manner.

It has now been discovered that flashing, carbonization, and the formation of tarry by-products can be substantially minimized in the reaction of chlorine and pyridine to form 2-chloropyridine, when gaseous chlorine is first admixed with vapors of carbon tetrachloride and the resulting mixture is then reacted with pyridine.

The molar ratio of pyridine to chlorine employed in the reaction of this invention is generally between about 1:1 and about 4:1, and is preferably between about 2:1 and about 3.5:1. When the molar ratio is less than about 1:1, the yield of 2-chloropyridine is reduced substantially. However the ratio may be increased substantially above 4 without affecting the yield of 2-chloropyridine, but there is a significant expense in handling the excess amount of pyridine.

The molar ratio of carbon tetrachloride to chlorine in the mixture reacted with the pyridine is generally between about 0.5:1 and about 5:1, and preferably between about 1:1 and about 2:1. The mixture of chlorine and carbon tetrachloride is most easily prepared by bubbling chlorine gas through a heated container of carbon tetrachloride at a rate sufficient to yield a mixture of the two materials in the above-mentioned proportions.

Reaction temperatures in the range between about 300° C. and about 420° C., and preferably between about 350° C. and about 400° C., are generally employed.

It is preferred to employ a fixed bed reactor through which gaseous pyridine and the gaseous mixture of chlorine and carbon tetrachloride are passed in concurrent flow. The bed may be packed with any suitable material that is inert with respect to the reactants and product. For example, glass beads, ceramics, and the like may be employed. The residence time of the reactants and products in the reactor should be maintained as low as possible in order to inhibit flashing, carbonization, and the formation of tarry by-products. Generally a residence time in the range between about 0.5 and about 1.5 seconds is sufficient.

A gaseous reaction product, which predominates in 2-chloropyridine, and which contains carbon tetrachloride and unreacted chlorine and pyridine is then condensed by cooling, or preferably by contacting the reaction gases with an aqueous spray. Condensation of the reaction gases in this manner yields a lower organic phase which contains substantially all of the 2-chloropyridine product, some unreacted pyridine and carbon tetrachloride. An upper aqueous phase also forms which predominates in pyridine hydrochloride. A portion of the aqueous phase, with some makeup water, may be recycled for use in condensing additional gaseous reaction products. The organic phase, may then be distilled or otherwise processed to recover a 2-chloropyridine product. If desired, carbon tetrachloride and unreacted pyridine may be recovered from the distillation step and recycled to the chlorination step.

The following examples are presented without intention of being limited thereby. All parts and percentages are by weight unless otherwise specified.

*Examples 1–3*

The apparatus employed in Examples 1–3 included a one-liter, three-necked flask provided with a magnetic stirrer and a heating mantle. The flask was employed for preparing the gaseous mixture of chlorine and carbon tetrachloride. One neck of the flask served as an inlet for a chlorine sparge tube which communicated with a chlorine cylinder and conveyed chlorine bubbles below the level of the carbon tetrachloride in the flask. The second neck contained a thermometer which communicated with an automatic thermostat control which operated the heating mantle to maintain the temperature of the liquid at about 60° C. to effect vaporization of the carbon tetrachloride.

The third neck of the flask contained tubing which served as a gas outlet conduit for the gaseous mixture of carbon tetrachloride and chlorine. The gas outlet conduit conveyed the gaseous mixture of chlorine and carbon tetrachloride from the flask to the interior of an inclined tube reactor of one inch diameter. The gas outlet conduit was wrapped with heating tape to maintain the gaseous mixture in a gaseous state.

The inclined tube reactor was positioned within an electric tube furnace which maintained the temperature of the reaction in the range between about 350° C. and 375° C. The reactor was packed with glass beads and had a void space of about 32 milliliters. The packing was held in the reactor by means of a perforated disc secured to the reactor wall at each end of the packing. The gas outlet conduit discharged the gaseous mixture of chlorine and carbon tetrachloride into the reactor by means of a perforated tube positioned about midway between the top and the bottom of the packing. A thermocouple well, 8 millimeters in diameter, extended from the lower end of the packing up to about the center of the packing.

While the gaseous mixture of chlorine and carbon tetrachloride was passed into the reactor through the perforated tube, gaseous pyridine was fed through the upper perforated disc into the packing of the reactor. Upon contact with the gaseous mixture of chlorine and carbon tetrachloride, 2-chloropyridine was formed. The reaction product flowed through the lower perforated disc in the reactor and passed into an aqueous spray or quench wherein gaseous components of the reacted product were condensed. The quenched liquor was then conveyed to a settling vessel wherein an upper aqueous phase and a lower organic phase were formed. The lower organic phase contained substantially all of the 2-chloropyridine product and was separated by decanting for further purification to recover the 2-chloropyridine product. The upper aqueous phase, which contained dissolved therein substantially all of the pyridine hydrochloride formed during the reaction was gradually withdrawn from the settling tank and recycled to the quenching step.

In Example 1, one mole of chlorine was passed through the carbon tetrachloride in the flask to yield a mixture containing the two ingredients in a molar ratio of 1.5 moles of carbon tetrachloride per mole of chlorine. Pyridine (1.55 moles) in gaseous form was fed into the reactor over a period of one hour and 1.09 moles of unreacted pyridine were recovered indicating a conversion of 48.5 percent pyridine. The residence time of the reactants in the reactor was 0.5 second. Vapor phase chromatographic analysis of the organic phase after quenching showed that 0.41 mole of 2-chloropyridine was produced, which was equivalent to a yield of 56 percent based upon pyridine conversion.

In Example 2, the procedure of Example 1 was repeated with the exception that 0.54 mole of chlorine, admixed with carbon tetrachloride in a ratio of 1 mole of chlorine to 1.5 moles of carbon tetrachloride, was contacted with 1.5 moles of pyridine in the reactor. The residence time of the reactants in the reactor was 0.8 second. Analysis of the aqueous phase showed 1.23 moles of pyridine were unreacted, indicating a conversion of pyridine of 36 percent. The yield of 2-chloropyridine was 54 percent, based upon the percent conversion of pyridine.

In Example 3, 0.96 mole of chlorine was fed to the reactor, admixed with carbon tetrachloride in a ratio equivalent to 1.5 moles of carbon tetrachloride to 1 mole of chlorine. Gaseous pyridine (1.91 moles) was fed to the reactor and 1.37 moles of unconverted pyridine were recovered, which indicated a pyridine conversion of 48.7 percent. The residence time of the reactants in the reactor was 1.2 seconds and the molar ratio of pyridine to chlorine in the reaction was maintained at about 2:1. The yield of 2-chloropyridine based upon conversion of pyridine was 63 percent.

*Example 4*

In the apparatus of Example 1, 8.54 moles of chlorine were admixed with sufficient gaseous carbon tetrachloride to provide a mixture containing these ingredients in a ratio of 2 moles carbon tetrachloride to 1 mole of chlorine. This mixture was contacted in the bed of the reactor with 25.4 moles of pyridine gas for a period of 4.5 hours. The temperature of the reactor was maintained in the range between about 375° C. and 400° C. The molar ratio of pyridine to chlorine was about 3.2:1 and the residence time in the reactor was about 0.8 second. About 8.6 moles of pyridine were converted, which was equivalent to about 34 percent conversion. Based upon this conversion a yield of 2-chloropyridine of 82 percent was obtained.

*Example 5*

The procedure of Example 4 was repeated with the exception that 6.1 moles of chlorine were admixed with sufficient carbon tetrachloride to provide a mixture containing these ingredients in a molar ratio of 1.9:1. The mixture was contacted with about 19 moles of gaseous pyridine in the reactor over a period of 3.3 hours. The molar ratio of pyridine to chlorine during the reaction was about 3.1:1 and a residence time in the reactor of 0.8 second was obtained. About 35 percent of the pyridine was converted to 2-chloropyridine and based upon this conversion, a yield of 70 percent 2-chloropyridine was obtained.

Various modifications of the invention may be employed without departing from the spirit and scope of the invention. Therefore, I do not wish to be limited except by the appended claims.

I claim:

1. In the process of preparing 2-chloropyridine by reacting chlorine and pyridine in a gaseous phase, the improvement which comprises carrying out the reaction in the presence of carbon tetrachloride in gaseous form.

2. The process of claim 1 wherein the reaction is carried out at a temperature in the range between about 300° C. and about 420° C.

3. The process of claim 1 wherein the reaction is carried out at a temperature between about 350° C. and about 400° C.

4. In the process for preparing 2-chloropyridine by reacting chlorine with pyridine in a gaseous phase, the improvement which comprises admixing chlorine with carbon tetrachloride to form a gaseous mixture, reacting said gaseous mixture with gaseous pyridine at a temperature in the range between about 300° C. and about 420° C. to yield a gaseous reaction product containing 2-chloropyridine, condensing said gaseous reaction product to yield an organic phase containing 2-chloropyridine, and distilling 2-chloropyridine from said organic phase.

5. The process of claim 4 wherein said reaction is carried out at a temperature in the range between about 350° C. and about 400° C., and wherein said gaseous reaction product is admixed with an aqueous medium to yield a liquid organic phase and a liquid aqueous phase.

6. The process of claim 5 wherein the molar ratio of said carbon tetrachloride to said chlorine is in the range between about 0.5:1 and about 5:1, and wherein the molar ratio of said pyridine to said chlorine in said gaseous mixture is in the range between about 1:1 and about 4:1.

7. The process of claim 5 wherein the molar ratio of said carbon tetrachloride to said chlorine is in the range between about 1:1 and about 2:1, and wherein the molar radio of said pyridine to said chlorine in said gaseous mixture is in the range between about 2:1 and about 3.5:1, and wherein the reaction temperature is in the range between about 350° C. and about 400° C.

8. The process of claim 6 wherein said gaseous mixture of chlorine and carbon tetrachloride is prepared by bubbling gaseous chlorine through liquid carbon tetrachloride at a temperature of about 60° C., whereby gaseous mixture of chlorine and carbon tetrachloride is evolved.

9. The process of claim 6 wherein said aqueous phase is separated from said organic phase and contacted with additional gaseous reaction product.

References Cited in the file of this patent

UNITED STATES PATENTS

| | | |
|---|---|---|
| 1,977,622 | Hibaut et al. | Oct. 23, 1934 |
| 2,820,791 | Shermer | Jan. 21, 1958 |
| 2,839,534 | Shrader et al. | June 17, 1958 |